United States Patent [19]

Truong

[11] Patent Number: 5,006,101

[45] Date of Patent: Apr. 9, 1991

[54] LOCKING-FOUR-WHEEL DRIVE LOCKING-TWO-WHEEL DRIVE

[76] Inventor: Tran-dinh Truong, 803 E. Spreading Oak, Houston, Tex. 77076

[21] Appl. No.: 339,669

[22] Filed: Apr. 18, 1989

[51] Int. Cl.⁵ .............................................. F16H 1/44
[52] U.S. Cl. .................................... 475/221; 475/228
[58] Field of Search ................ 74/705, 711, 715, 724; 180/249

[56] References Cited

U.S. PATENT DOCUMENTS

| | | | |
|---|---|---|---|
| 335,208 | 2/1886 | Bourcart | 74/705 X |
| 1,401,204 | 12/1921 | Storey | 74/715 X |
| 2,206,907 | 7/1940 | Loughridge | 74/711 |
| 2,209,367 | 7/1940 | Watson | 74/705 X |
| 2,342,755 | 2/1944 | Randall | 74/715 |
| 2,898,779 | 8/1959 | Mickelson | 74/711 |
| 3,299,741 | 1/1967 | Twiford | 74/705 X |
| 4,762,022 | 8/1988 | Johnshoy | 74/715 X |

*Primary Examiner*—Dirk Wright

[57] ABSTRACT

A gear box for locking two or four-wheel drive mechanism consists of several planetary gearing systems having sun gears and a plurality of pinions connected to carriers. Sun gears and pinions are connected inside ring gears. Systems are connected to an input shaft and give outputs to wheels. System are also connected to four worm gears which are driven by differential gearing units.

15 Claims, 16 Drawing Sheets

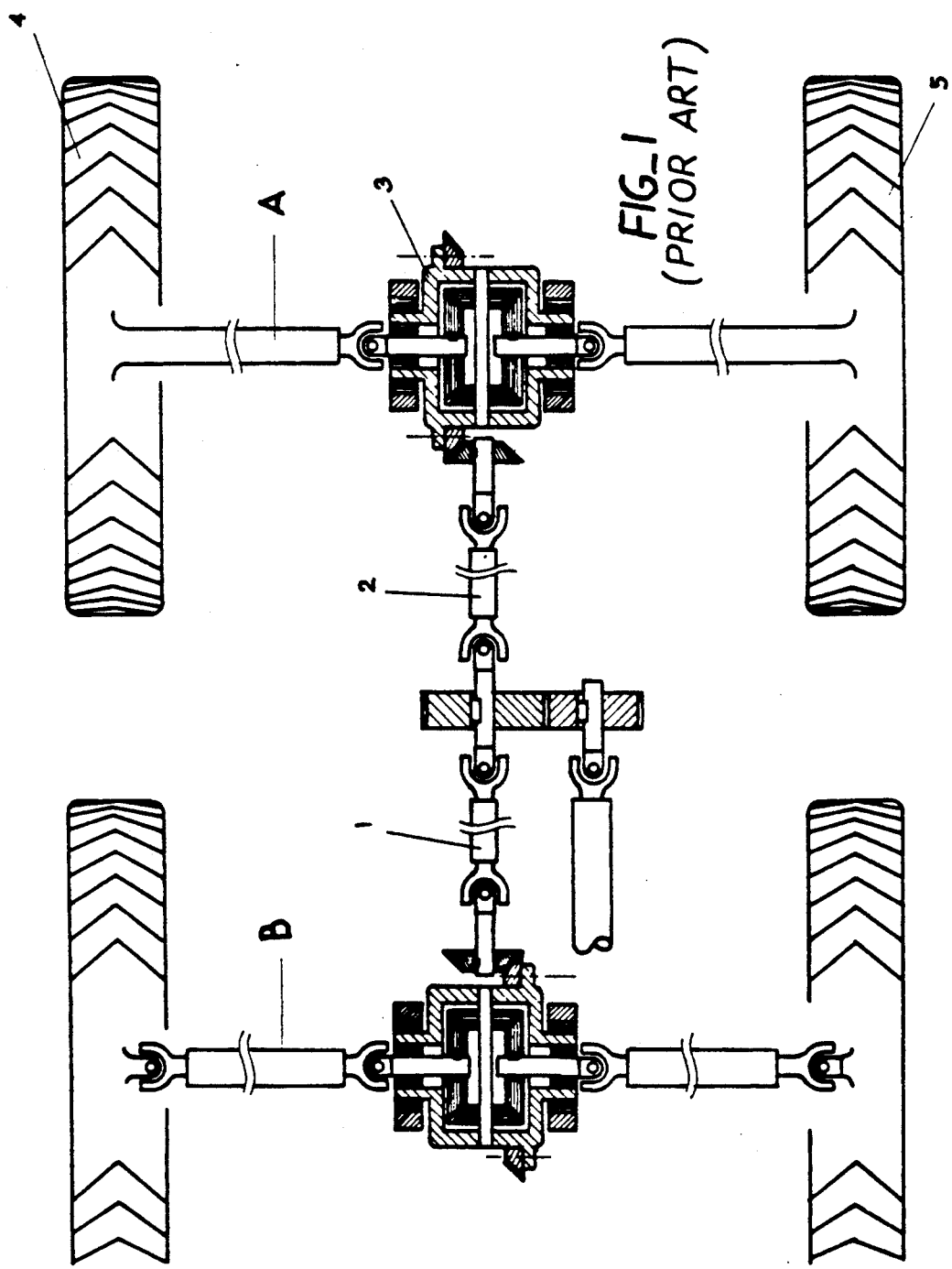
FIG_1
(PRIOR ART)

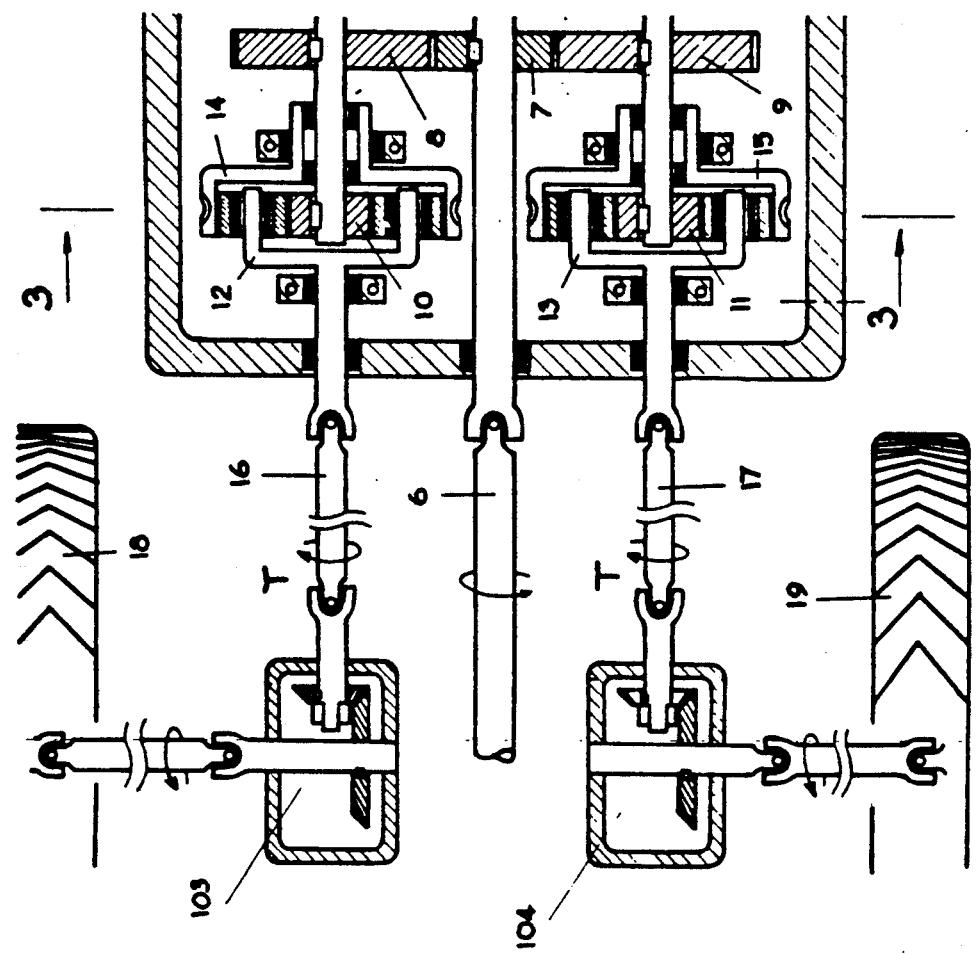
FIG_2

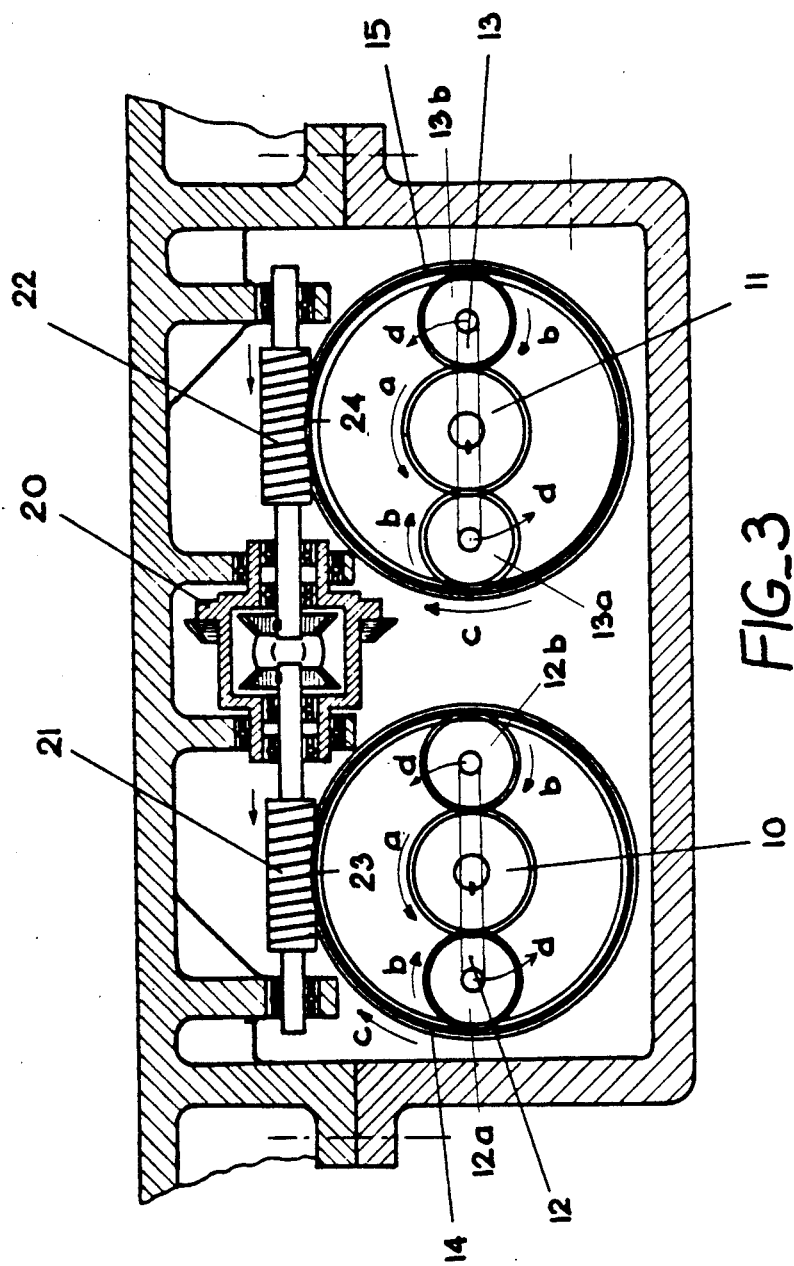
FIG_3

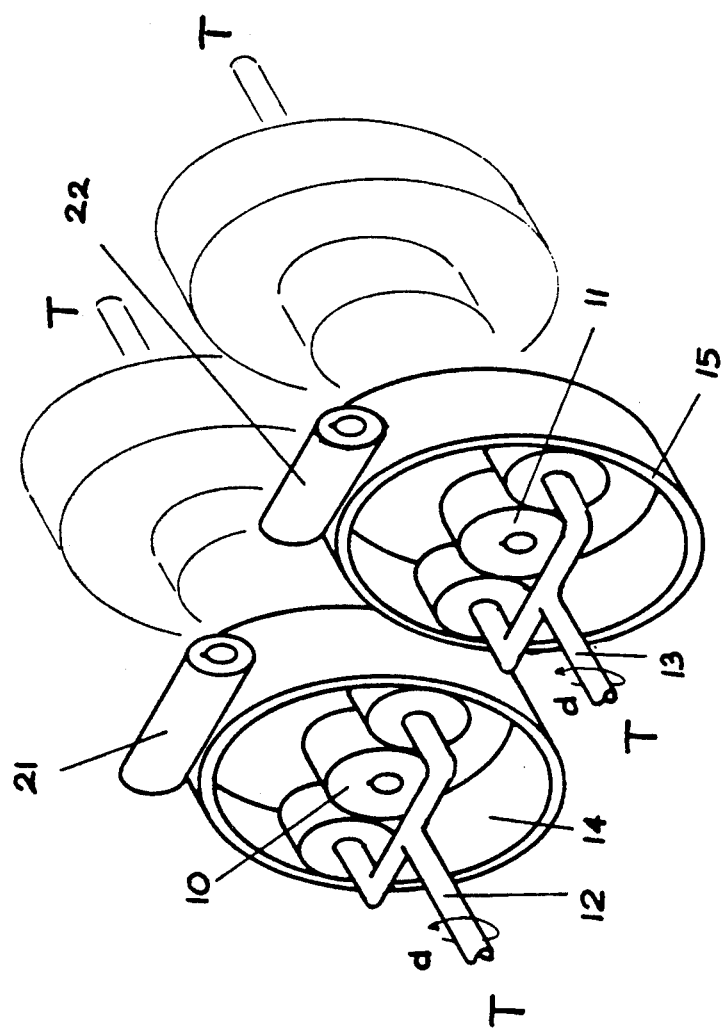
FIG_4

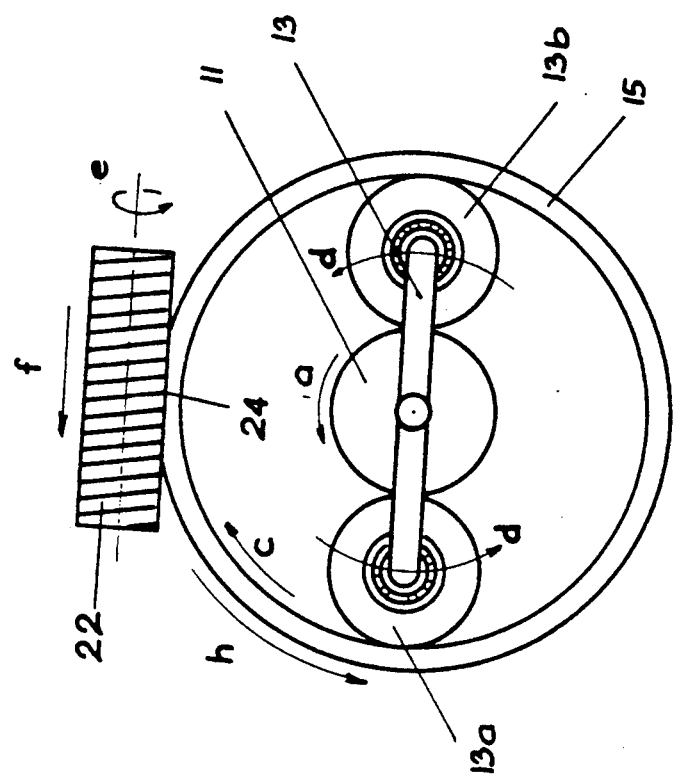
FIG_5B
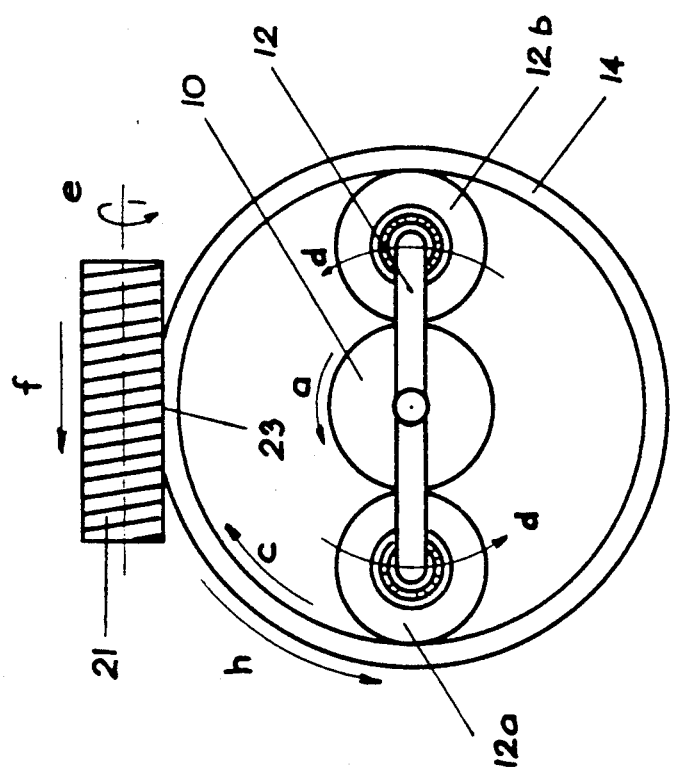
FIG_5A

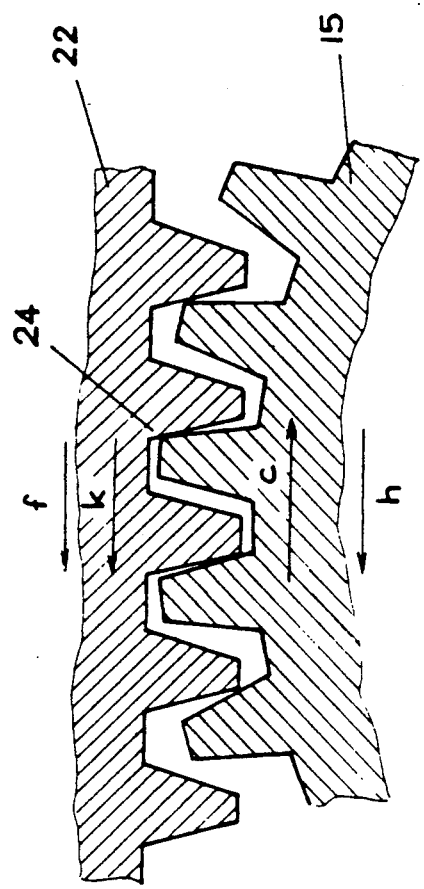
FIG_6A
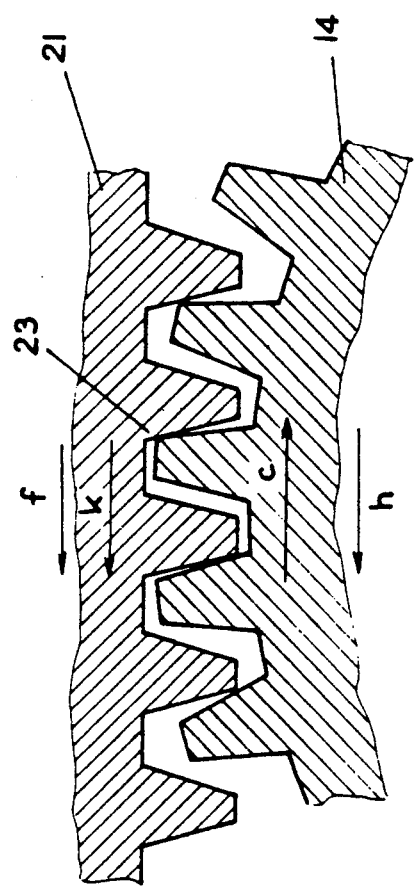
FIG_6B

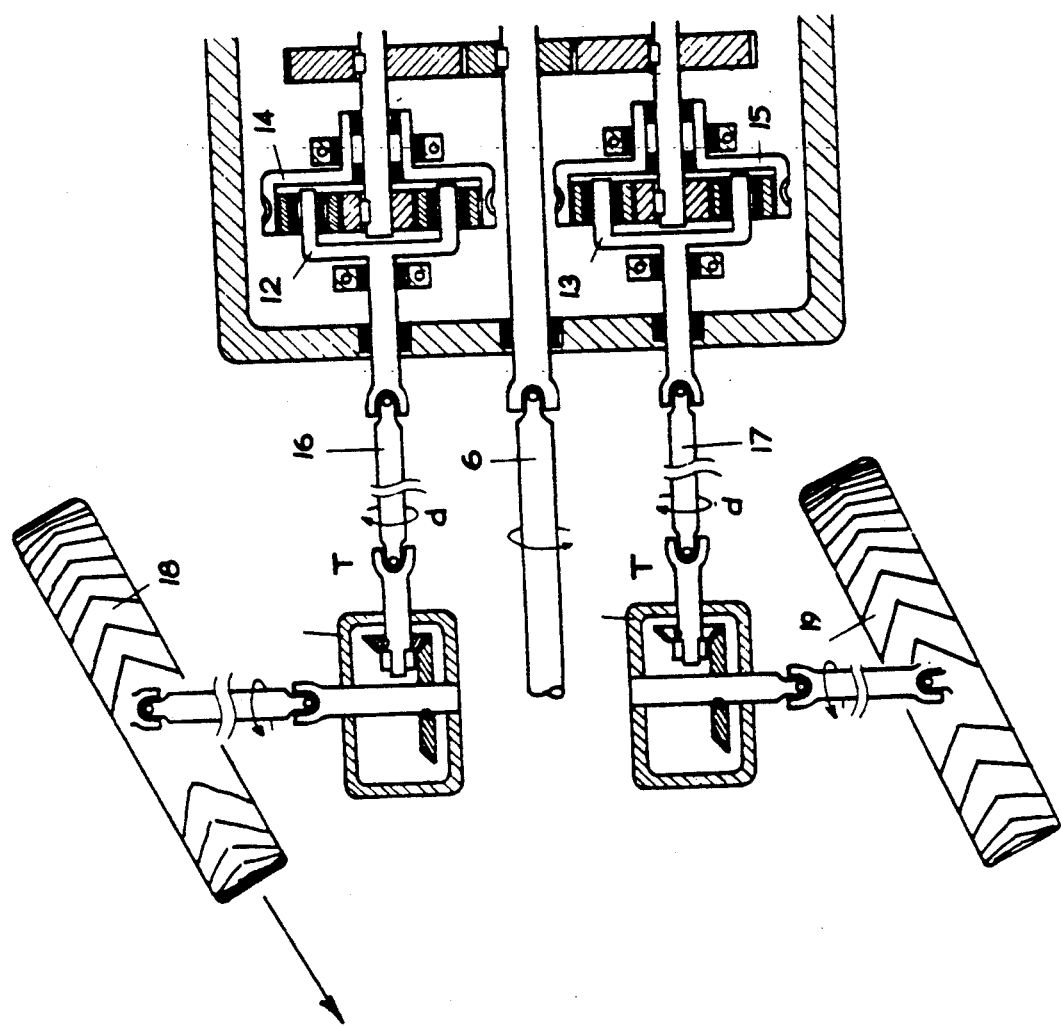

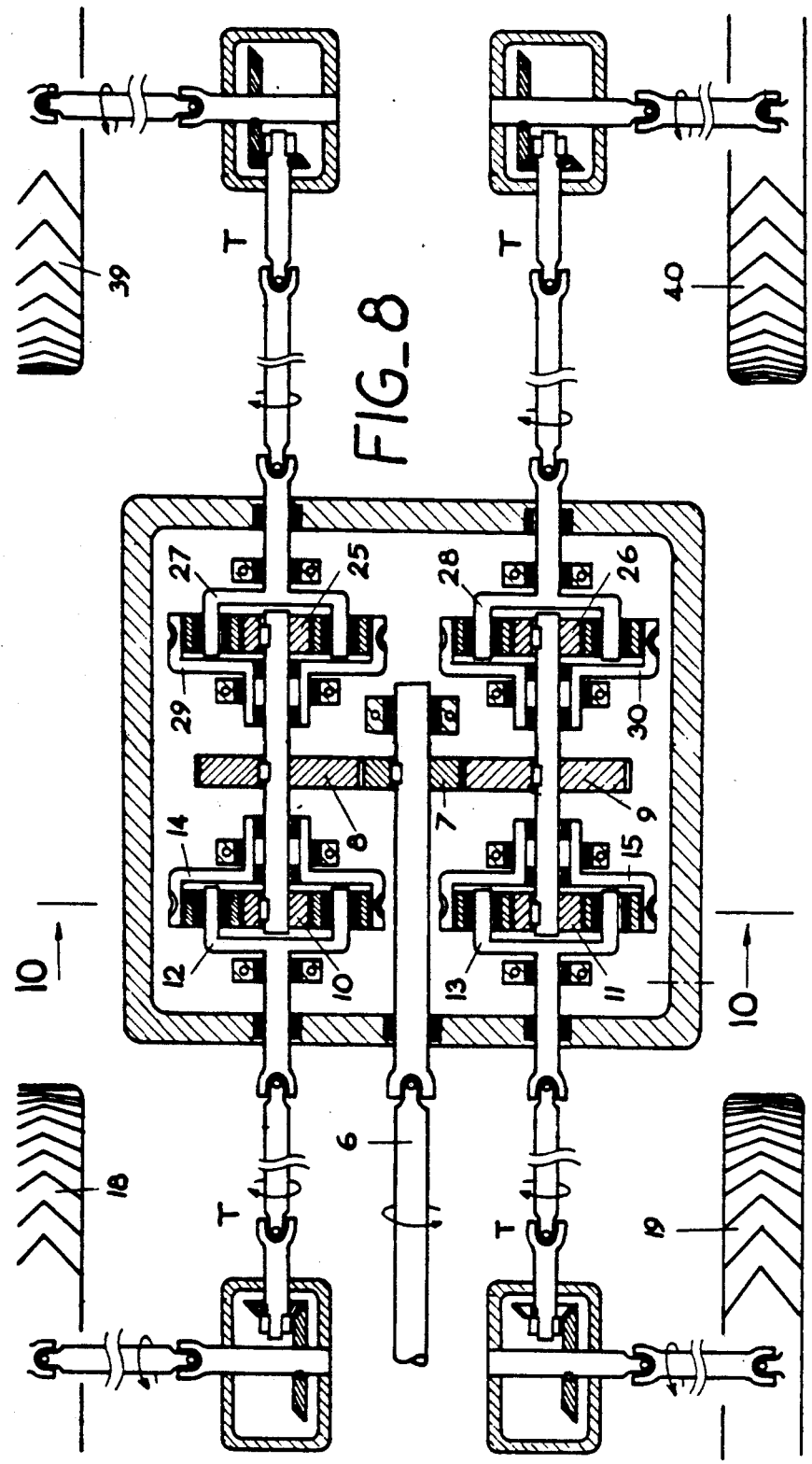
FIG_8

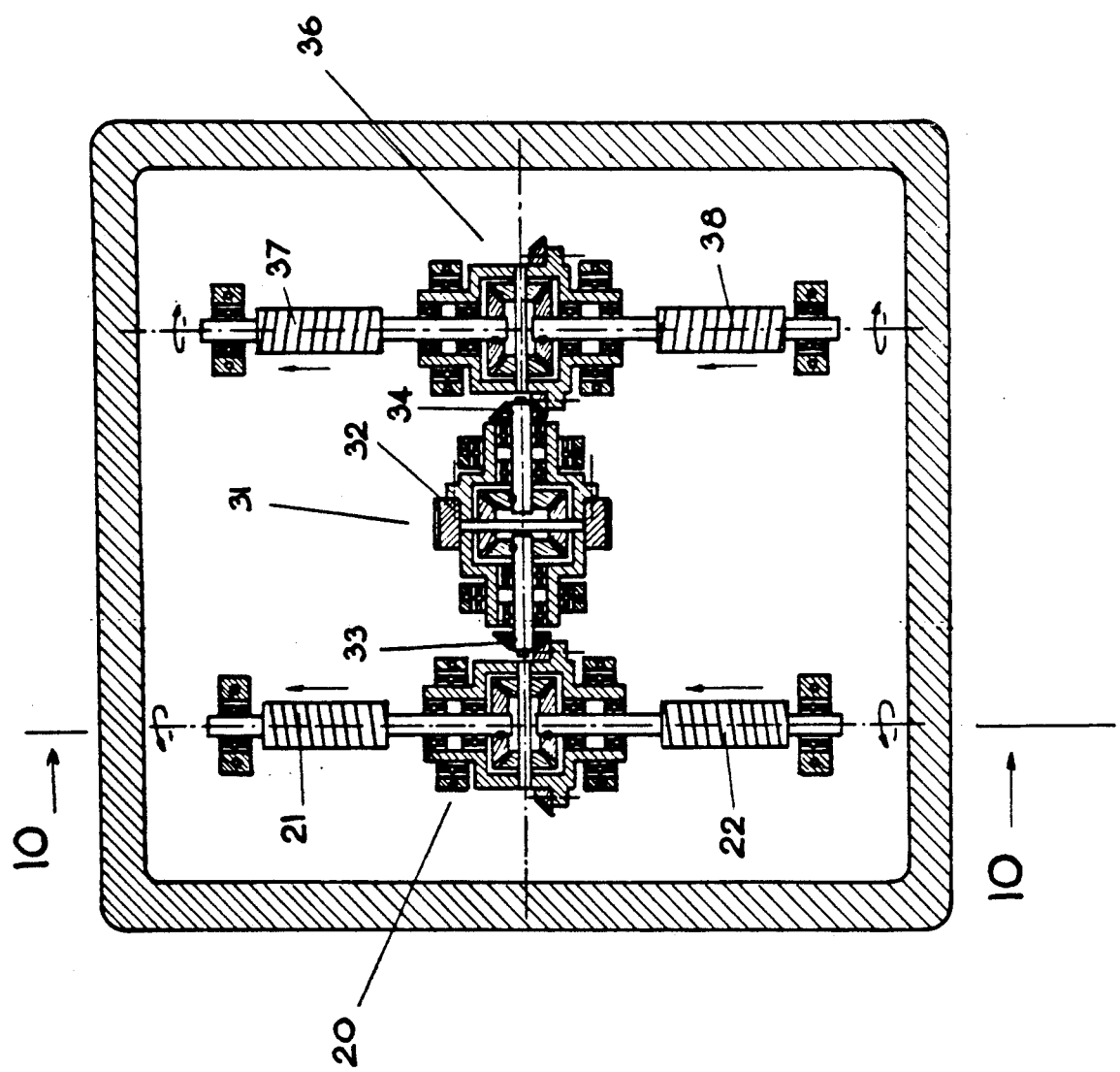
FIG_9

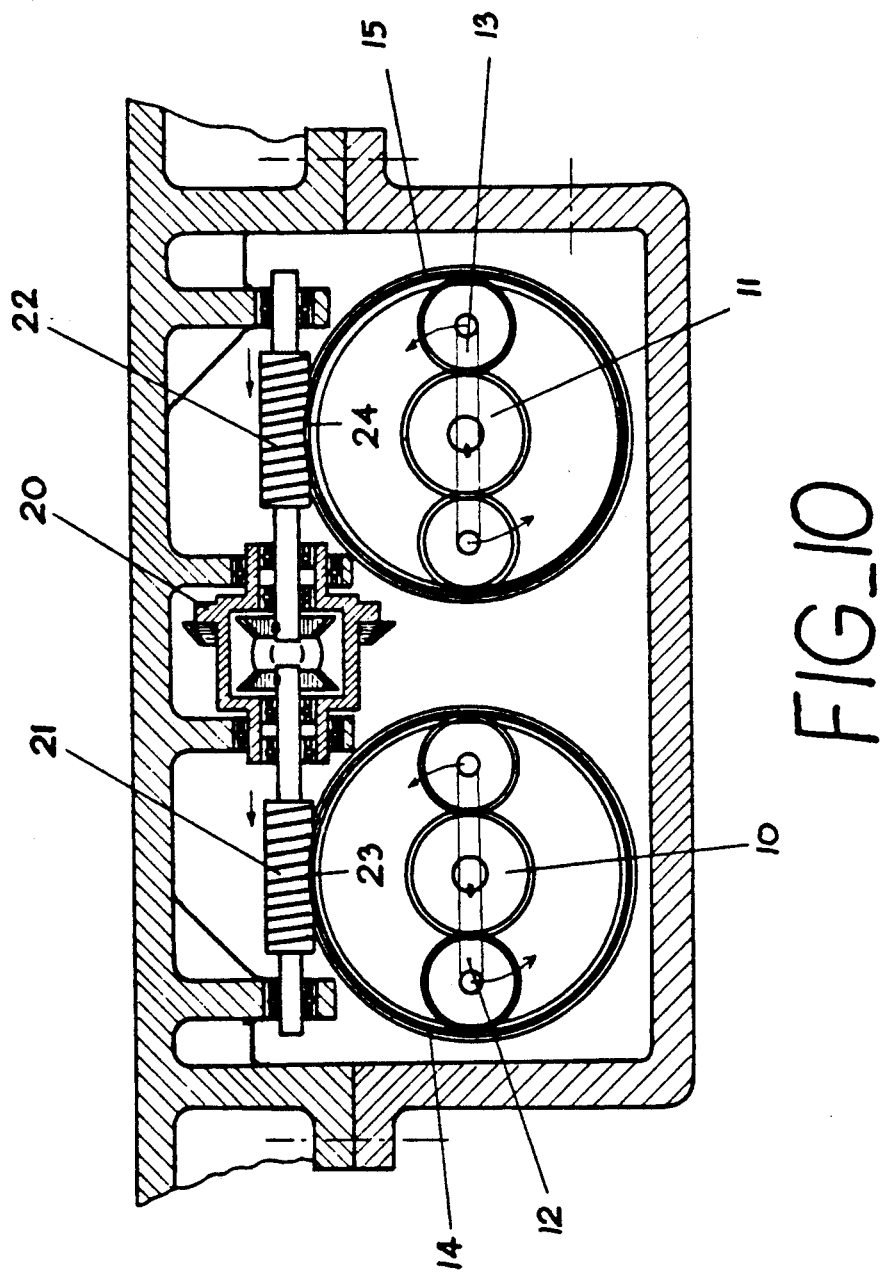
FIG_10

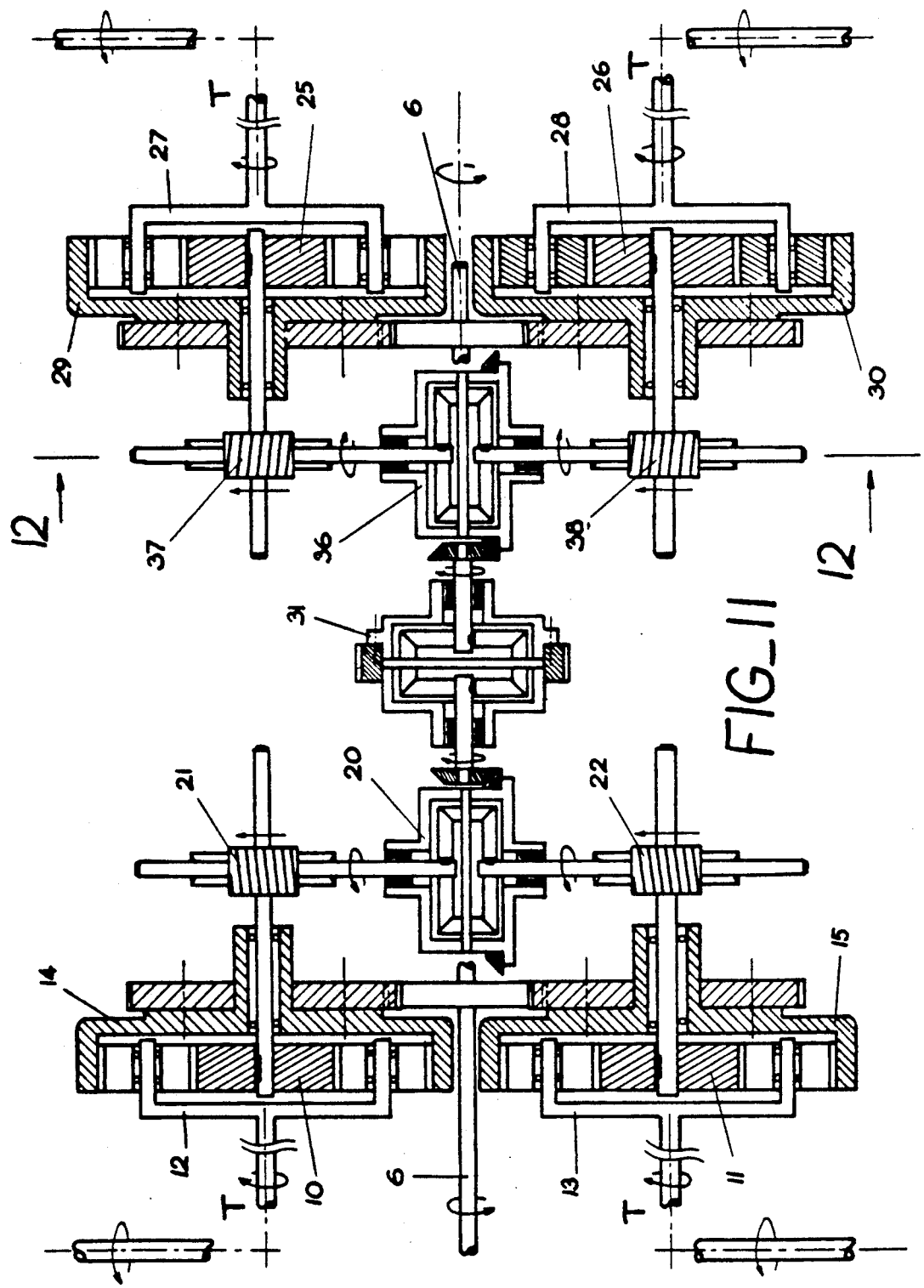

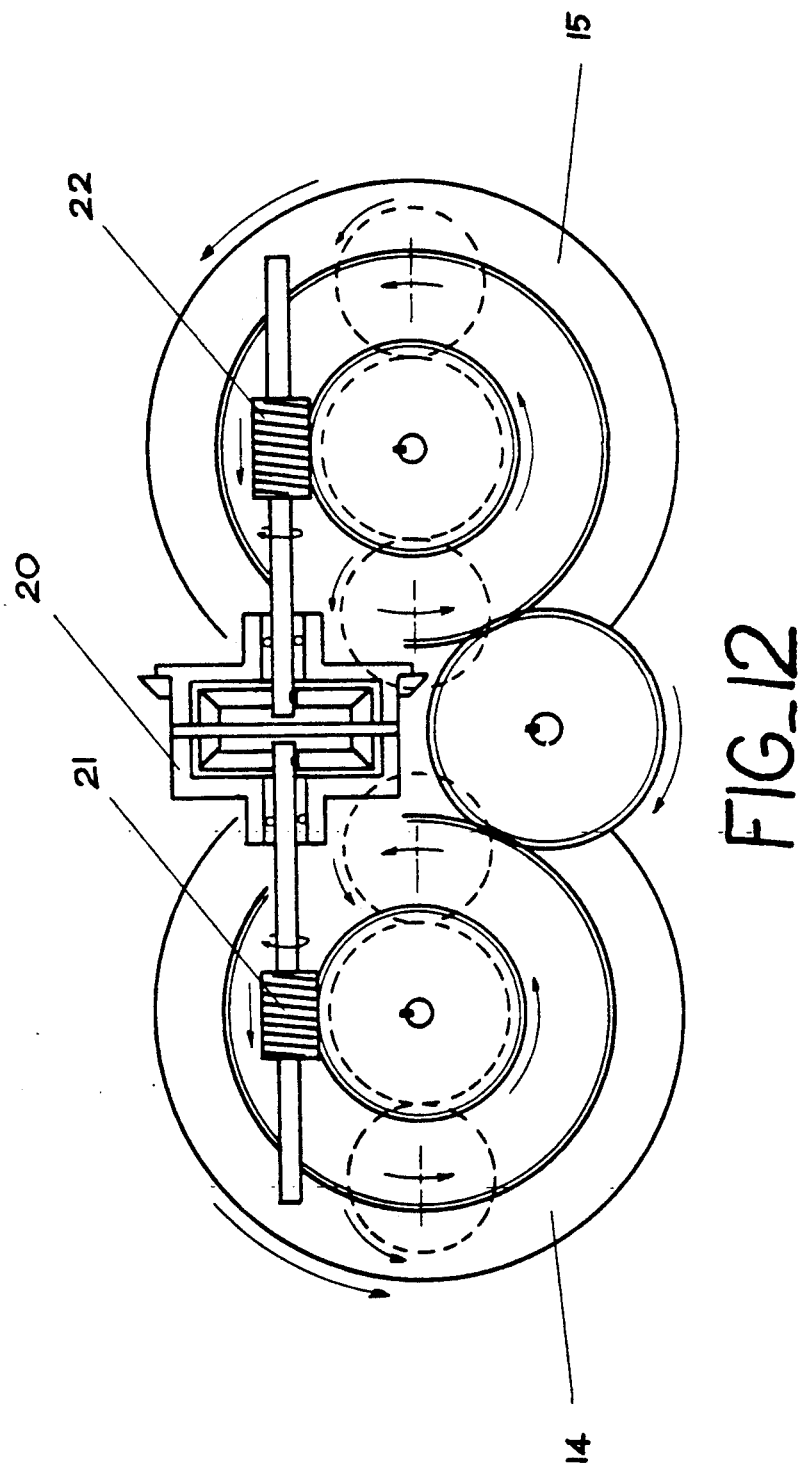

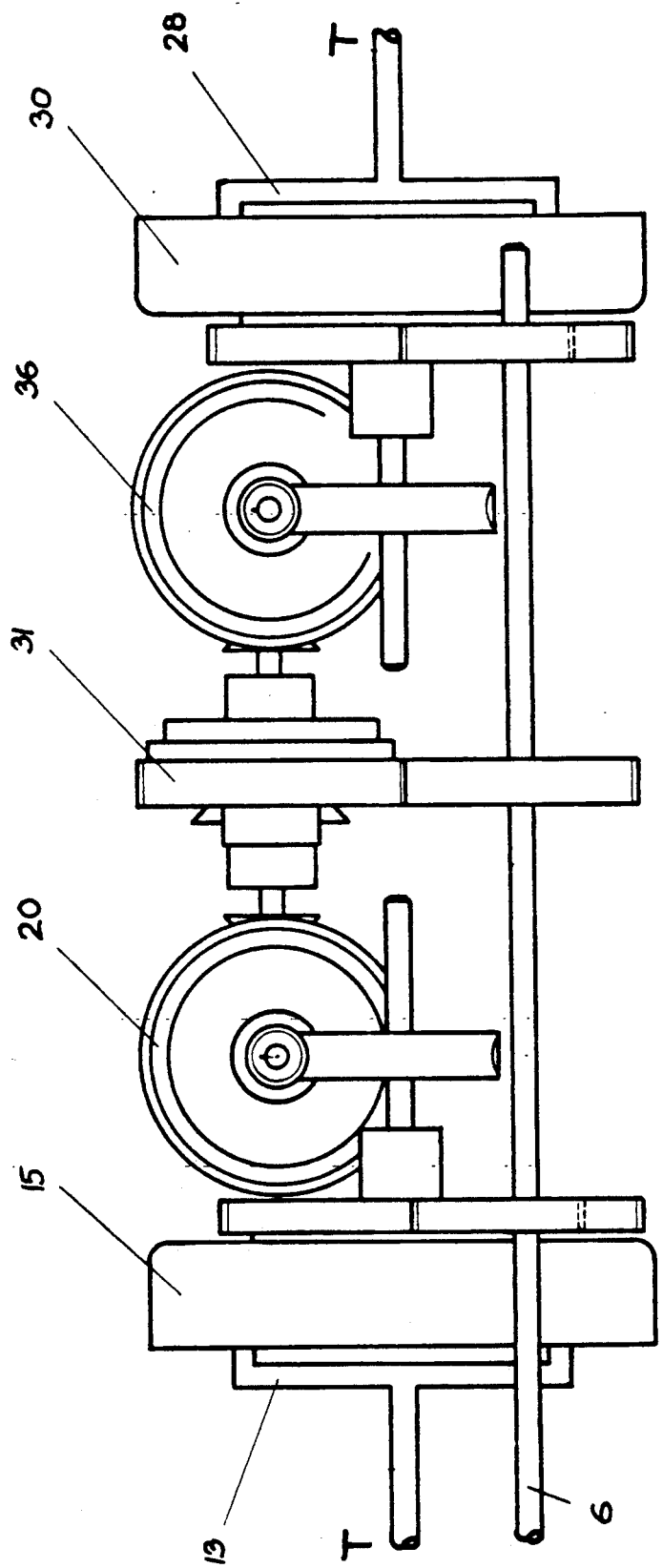
FIG_13

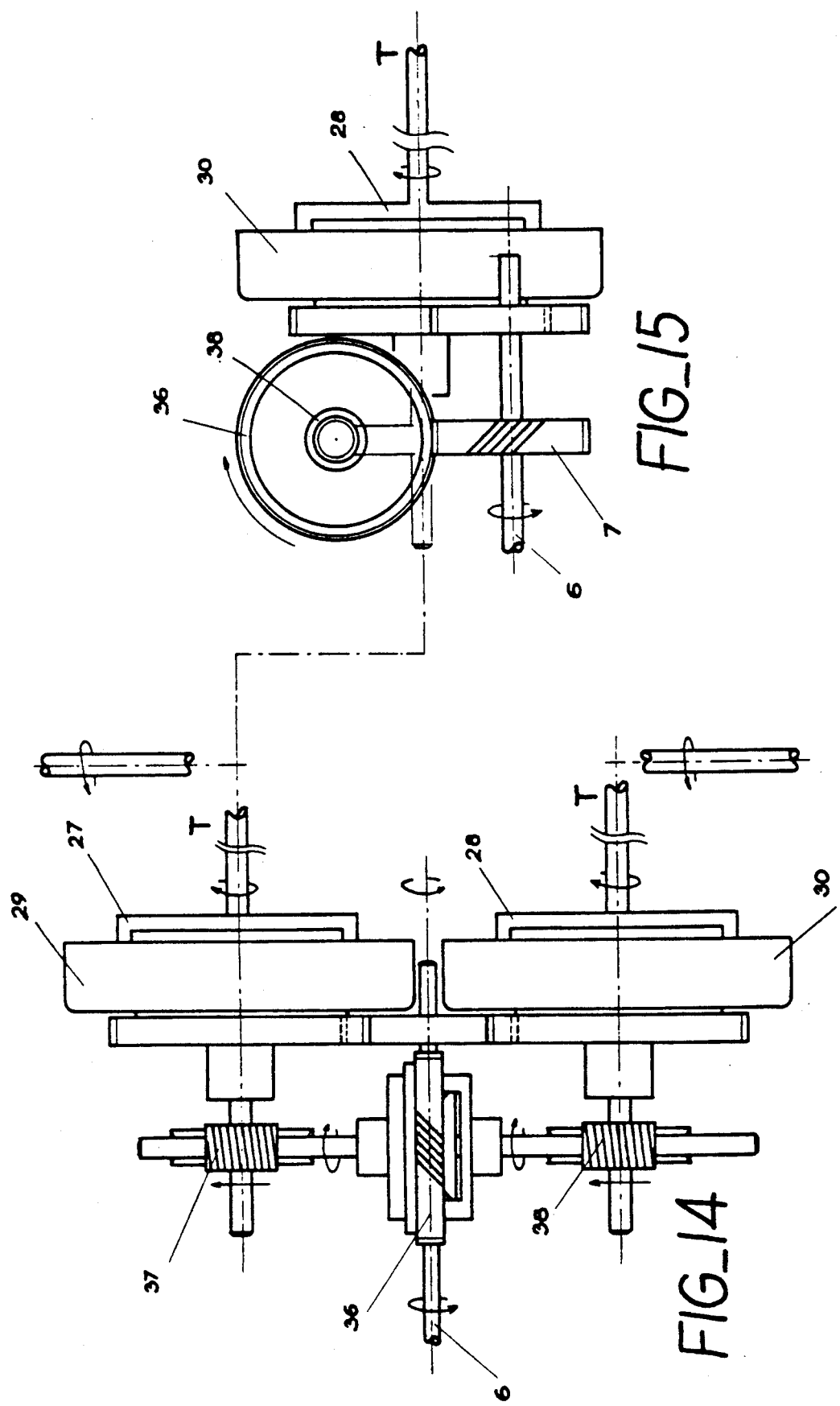

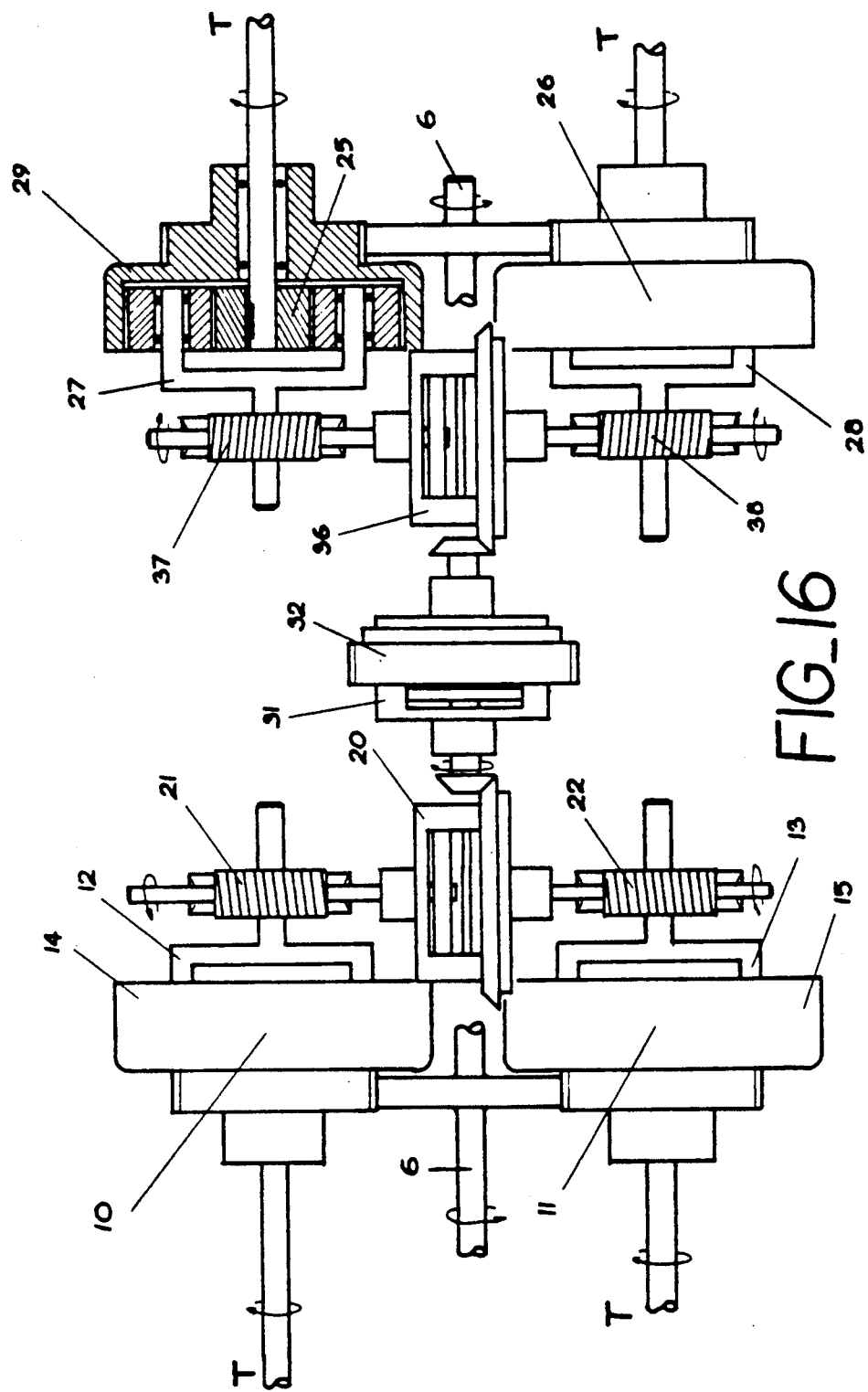

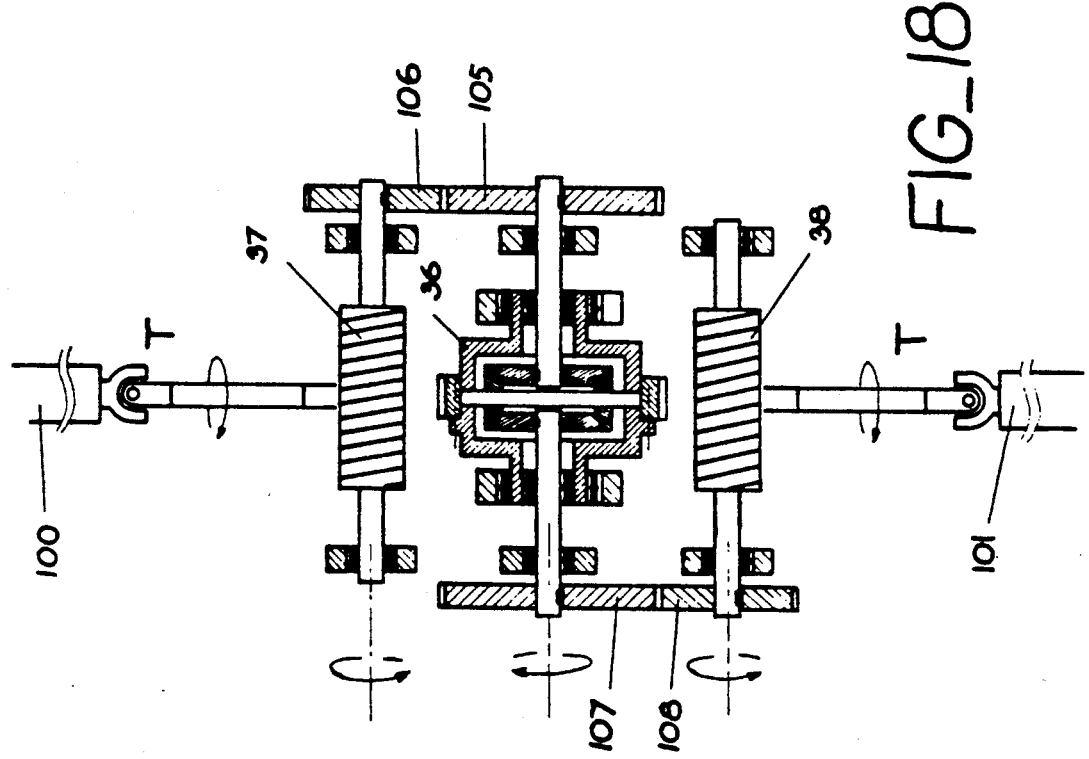
FIG_18
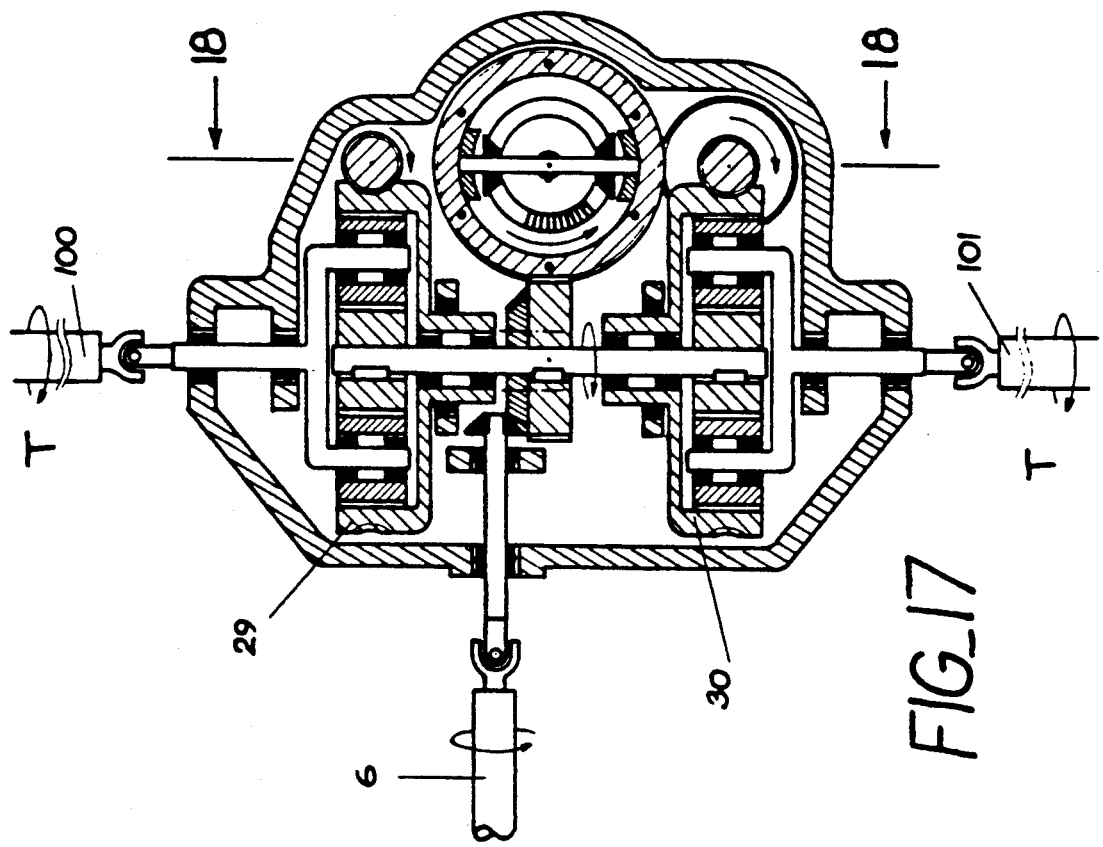
FIG_17

LOCKING-FOUR-WHEEL DRIVE
LOCKING-TWO-WHEEL DRIVE

BACKGROUND OF THE INVENTION

When a car turns, the outside wheels of the turn must rotate faster and travel at a greater distance than the inside wheels. The conventional differential gearing units allow this to happen. Cars can easily become stuck in slippery conditions such as mud, snow or sand, because of a lack of friction on the rotating wheel even if the other three wheel have good traction.

The conventional differential gearing unit in a two-wheel drive system would only rotate one wheel when the car gets stuck, since the conventional gearing units do not lock two wheel together. Similarly, in a four-wheel drive system, the conventional gearing units would only rotate two wheels when the cars get stuck, because four wheels are not locked together.

In the conventional four-wheel drive mechanism, as shown in FIG. 1, there are two drive shafts. Number 1 is for the front axle, and number 2 is for the rear axle. These are connected to two conventional differential gearing units, shaft 1, and shaft 2 have same ratio of rotation which means the total rotations of two front wheels must be equal to the total rotation of two rear wheels. The same ratio of rotations is only good when the car moves on a straight line with four wheels of the same size. However, when the car turns, the total number of rotations of the two front wheels are larger than the total number of rotations of the two rear wheels.

The result is one or more of the wheels will skid on the pavement; therefore, the engine has to try harder to overcome this skidding. The same situation will occur when the car moves on a straight line with one wheel smaller than the others (for example, when the smaller spare tire is used or when a tire has low air). Thus, energy is wasted and tires are easily worn out.

SUMMARY OF THE INVENTION

The primary object of the present invention is to solve all of the above mentioned problems for two and for four-wheel drive cars.

It is another objective of the present invention to provide a gearing system that will rotate all four wheels simultaneously when the car gets stuck, and to overcome the skidding problem in a four-wheel drive mechanism.

Still, another object of the present invention is to provide a gearing system to drive all two wheels which rotate simultaneously when a two-wheel drive car gets stuck.

Further object of the present invention is to provide a new and useful arrangement of gears optimizing the power transmitting through the gearing system.

BRIEF DESCRIPTION OF THE DRAWINGS

FIG. 1 is the conventional differential gearing arrangement for four-wheel drive.

FIG. 2 is a top view of bottom section, according to the present invention, showing two planetary gearing system for two-wheel drive.

FIG. 3 is a front view cut at 3—3 of FIG. 2, showing top and bottom sections assembled together according to the present invention.

FIG. 4 is two planetary gearing systems of the present invention shown in three dimention.

FIG. 5A & 5B are directions and rotations of the gearing system of FIG. 2.

FIG. 6A & 6B are detailed illustrations of worm gears and ring gears system for two-wheel drive.

FIG. 7 is an illustration when a two-wheel drive car makes a turn.

FIG. 8 is a top view of bottom section according to the present invention showing four-wheel drive.

FIG. 9 is a top view of top section according to the present invention for the four-wheel drive system illustrated in FIG. 8.

FIG. 10 is a front view cut at 10—10 of FIG. 8 and FIG. 9 showing top and bottom sections assembled together according to the present invention.

FIG. 11 is a different gearing arrangement of the present invention for four-wheel drive.

FIG. 12 is a front view cut at 12—12 of FIG. 11

FIG. 13 is a side view of FIG. 11

FIG. 14 is another arrangement of gearing of the present invention for two-wheel drive.

FIG. 15 is a side view of FIG. 14

FIG. 16 is a sectional top view of another gearing arrangement of the present invention for four-wheel drive.

FIG. 17 is a top view of another gearing arrangement of the present invention for four-wheel drive.

FIG. 18 is a sectional rear view of FIG. 17 cut at 18—18.

DETAILED DESCRIPTION OF THE DRAWINGS

FIG. 1 shows a typical conventional gearing system for automobiles. Note that well-known differential gearing unit 3 is connected to the wheels 4, 5 in an axle A. When the car is sticking, only one wheel, i.e. either wheel 4 or 5, whichever has less friction will rotate, the other wheel does not rotate due to the limitation of the arrangement of the conventional differential gear. Similarly the same thing happens to the other axle B.

FIG. 2 shows the preferred embodiment of the present invention for locking two-wheel drive system. When input shaft 6 rotates, it makes gear 7 rotate, gear 7 in turn makes gears 8, 9 rotate, gears 8, 9 make gear 10 and 11 rotate in the same direction and ratio to each other. Sun gears 10, 11 rotate while ring gears 14, 15 are held by worm gears (not shown in FIG. 2). Thus, the sun gears 10, 11 rotate carriers 12, 13. Carrier 12, 13 then drive output shafts 16, 17 respectively at output torques "Ts" which supsequently turn the wheels 18, 19.

FIG. 3 is a front view cut at 3—3 of FIG. 2 showing top and bottom section assembled together according to the present invention. In this figure, worm gears 21, 22 are shown which hold the ring gears 14, 15 at contact point 23, 24. Sun gears 10, 11 rotate in direction a as shown, sun gears 10, 11 rotate pinons 12a, 12b, 13a and 13b in direction b.

Without worm gears 21, 22 ring gears 14, 15 would rotate in direction c; however, ring gears 14, 15 are held by worm gears 21, 22 so pinions 12a, 12b, 13a, 13b drive the carriers 12, 13 in direction d as shown. The carriers 12, 13 then drive output shafts 16, 17 at output torques "Ts" (FIG. 2) which supsequently turn the wheels 18, 19.

The wheels 18, 19 would be rotated as long as the ring gears 14, 15 are held and driven by worm gears 21, 22 at contact points 23, 24—while sun gears 10, 11 are rotating. The holding forces of worm gears 14, 15 are depending on the frictions at contact points 23, 24 which are subsequently occurring when the wheels start to rotate on pavement.

Worm gear 21, 22 are connected to differential unit 20 which is driven by input shaft 6 (shown in FIG. 2). When input shaft 6 rotates, it drives differential gearing unit 20, differential unit 20 subsequently drives two worm gears 21, 22 in a manner such as when a worm gear responding to a greater force at a contact point of respective ring gear, that particular worm gear will stop and it transfers all rotations created by the input shaft 6 to the other worm gear which has less force exerted until the forces exerted on both worm gears are equalled.

FIG. 4 shows the system in three dimension. Note that carriers 12, 13 have their rotations in direction d.

FIG. 5A and 5B show worm gears 21, 22 with their rotations direction e. When either one of these worm gears 21, 22 stop, a respective ring gear would be held in place. When either one of these worm gears 21, 22 rotate, its teeth move in direction f and driving the respective ring gear in the direction h, thus overcoming force C exerted by the respective pinions.

FIG. 6A and 6B are a detailed look at contact point 23, 24 of ring gears 14, 15 and worm gears 21, 22. The forces being exerted at these contact points depend on the friction between the wheels and the pavement. In other words, all frictional forces of the wheels and the pavement will be transferred to contact points 23, 24, or in another words, gears 21, 22 can "feel" the friction of the wheels on the pavement at contact points 23, 24 and react by rotating or not.

When cars that have the present two-wheel drive gearing system get stuck, one wheel will have more friction than the other. Let's suppose that wheel 19 has more friction than wheel 18 (FIG. 2), the force exerted at contact point 24 between worm gear 22 and ring gear 15 would be greater than the force exerted at contact point 23 between worm gear 21 and ring gear 14. Worm gear 22 thus will stop and transfer all rotation provided by the input shaft 6 to worm gear 21. Worm gear 21 by receiving these transferred rotation will rotate faster and subsequently drive ring gear 14 more forward in direction h, these movements make wheel 18 turns faster while worm gear 22 still stops and it locks ring gear 15 in place, which means wheel 19 also has to rotate due to the rotating of the sun gear 11. (FIG. 2 and FIG. 3)

The object of the present invention is to provide a gearing system that enable both driving wheels to rotate simultaneously when cars get stuck. The different rotating ratio of both driving wheels in the sticking situation is meaningless, because no matter how fast the slippery wheel rotates, it will not pull the car out if the wheel with more friction does not turn, as it is with the conventional differential gearing.

The sticking problem is solved in the manner described in the above paragraph, i.e. both driving wheels have to rotate in the sticking situation since the worm gear of the more friction wheel (wheel 19 as in the above example) would stop and lock the respective ring gear in place, while the sun gear is rotated by the input drive shaft which in turn rotates the respective carrier which produces the output torque for rotating the wheel with more friction. In normal driving condition i.e. non-sticking situation, both worm gears 21, 22 rotate thus driving both ring gears 14, 15 in direction h with equal forces.

FIG. 7 shows a two-wheel drive car with the implement of the gearing system according to the present invention in turning condition. The outside wheel (wheel 18) of the turn will rotate faster than the inside wheel (wheel 19). Wheel 18 will make ring gear 14 turn faster than ring gear 15 in direction h, which means that less force will be created at contact point 23 as shown in FIG. 6A. Worm gear 22, now is exerting more force at contact point 24 between worm gear 22 and ring gear 15, worm gear 22 will be slowed down or stopped, and it will transfer rotations of the input shaft to worm gear 21 until worm gear 21 catches up with ring gear 14 in its direction k at contact point 23, as shown in FIG. 6A. Thus worm gear 21 drives ring gear 14 with a force at contact point 23 equal to the force exerted at contact point 24. Which means both wheels are driven with equal driving torque in different rotating ratios.

The mechanism of the present invention will perform exactly in same principle when cars have one wheel smaller than other. The worm gear of the smaller wheel will rotate faster at all times to compare to the rotation of the worm gear of bigger wheel to fulfill the different rotating ratio. Both ring gears now are driven at equal force at a different ratio and subsequently rotate the wheels.

FIG. 8 shows another embodiment of gearing arrangement of the present invention for locking-four-wheel drive. Input shaft 6 rotates which in turn makes gear 7 rotate, gear 7 makes gears 8, 9 rotate, gears 8, 9 drive sun gears 10, 11, 25, 26. As shown, sun gears 10, 11, 25, 26 have to rotate when input shaft rotate. Carriers 12, 13 drive wheels 18, 19, carriers 27, 28 drive wheels 39, 40. Four ring gears 14, 15, 29, 30 are locked or driven by four worm gears 21, 22, 37, 38 (shown in FIG. 9).

FIG. 9 is a top view of top section of FIG. 8. Four worm gears 21, 22, 37, 38 are shown. They are driven by three differential gearing units 20, 31, 36.

Unit 31 is connected to gear 7 of input shaft 6 by gear 32. Unit 31 then drives units 20 and 36 by connecting gears 33 and 34. Differential gearing unit 20 then drives worm gears 21, 22. Differential gearing unit 36 then drives worm gears 37, 38.

Due to the arrangement of three differential units 20, 31, 36 four worm gears 21, 22, 37, 38 are rotated through three differential units and rotation of the worm gears are transferable among them which depend on the force exerted at the contact point between the worm gears and their respective ring gears. The four worm gears will drive four ring gears with equal force with each other even with different rotation ratio. Because of this arrangement, the locking-four-wheel drive mechanism will perform exactly like a locking-two-wheel drive mechanism.

In normal driving condition, four worm gears drive four respective ring gears with equal forces. When a four-wheel-drive car implementing the gearing system according to the present invention gets stuck, the worm gear of the wheel that has less friction. Let's say worm gear 21 of wheel 18 in FIG. 10 will rotate farther since less force is exerted at the contact point 23 between the ring gear 14 and the worm gear 21 while the other three worm gear 22, 37, 38 (FIG. 9) would stop due to more force being exerted at the contact point between them and their three respective ring gears. Thus the worm gear 22, 37, 38 would lock the three respective ring gears in place, while the sun gears 11, 25, 26 (FIG. 8) keep rotating which drive the respective carriers 13, 27, 28 which produce output torques "Ts" to rotate the three wheels that have more friction 19, 39, 40.

Note that wheel 18 keeps rotating since it is assumed to have less friction in this example. This means all four driver wheels are simultaneously rotating when the input driver shaft 6 rotates.

As previously mentioned, the present invention is to further provide a mechanism that will enable all four wheels to rotate without skidding when the car makes a turn. As noted when the car turns, all four wheels rotate at different rotating ratio, their respective worm gears will transfer rotations among each other to fulfill the difference of the rotating ratio and drive four ring gears with the same force. It means all four wheels will drive the car with the same driving torque with different wheel rotations ratio without skidding.

The mechanism will perform in the same manner as when car drives with different size wheels.

When two-wheel drive or four-wheel drive cars implementing the gearing system according to the present invention go backward, i.e. in reverse position, all gears will rotate in opposite directions and the mechanism will perform in the same manner, but in the opposite rotating directions.

There is more than one way of arranging the gearing system in the present invention; however, the operating principle and the gears are the same. They all need planetary gearing systems and worm gears that are driven by differential gearing units. The following are some examples of other alternative arrangements of the gearing system: FIG. 11 is a different gearing arrangement of the present invention for four-wheel-drive. Four worm gears 21, 22, 37 and 38 driver four sun gears 10, 11, 25 and 26 respectively while the input shaft 6 drive four ring gears 14, 15, 29 and 30.

The advantage of this embodiment is to make the gear box thinner than the previous described arrangements, as shown in FIG. 12 as compared to FIGS. 3 and 10. Note that the differential gearing unit 20 is arranged lower in between the ring gears 14 and 15 of the planetary gearing systems.

FIG. 13 is a side view of FIG. 11 illustrating the differential gearing units 20, 31 and 36 arranged in between the ring gears 15 and 30 of the planetary gearing systems. Note that in this arrangement the height (i.e. thickness) of the gear box is less than the other arrangements shown in FIGS. 3 and 10, however, the length of the gear box is longer.

FIG. 14 is a different gearing arrangement of the present invention for two-wheel-drive system. Input drive shaft 6 drives the differential gearing unit 36 which subsequently drives the ring gears 29 and 30.

FIG. 15 is a right side view of FIG. 14 showing the driving gear 7 of the input drive shaft 6, gear 7 drives the differential gearing unit 36 at a right angle (i.e. driving gear 7 is perpendicular to the differential gearing unit 36).

FIG. 16 is a sectional top view of another gearing arrangement of the four-wheel-drive according to the present invention. The input drive shaft 6 drives both the ring gears 14, 15, 29, 30 and the differential gearing units 20, 21, 36 while worm gears 21, 22, 37 and 38 drive the carriers 12, 13, 27 and 28 respectively and the sun gears 10, 11, 25, 26 (note that only one sun gear 25 is clearly shown in FIG. 16) will provide output torques "Ts".

FIG. 17 is a top view of another gearing arrangement of the present invention for two-wheel-drive showing two output shafts 100, 101 are line up in an axle. Note that in this arrangement the miter gears 103, 104 (of FIG. 2) are eliminated since the output shafts 100, 101 are directly connected to the wheels.

FIG. 18 is a sectional rear view of FIG. 17 cut at 18—18 showing the differential gearing unit 36 drive the two worm gears 37, 38 through the connecting gears 105, 106 and 107, 108 respectively.

The wheels of cars change rotation ratios when cars make a turn. If equipped with fixed rotation ratio, cars cannot make a turn without skidding. If equipped with variable rotating ratios as they are with conventional differential gearing in the market today, only half the number of drive wheels rotate when cars get stuck. Automobile manufacturers fail when they try to combine both. It has been one way or the other.

The present invention is truly an invention and is what they have been looking for.

What I claim is:

1. A gear box for locking-four-wheel drive mechanism consists of four planetary gearing systems each having a sun gear and a carrier, a plurality of pinions connected to each said carrier each said sun gear and said pinions are connected inside of a ring gear and said systems are connected to an input shaft and give outputs to four wheels and said systems are connected to four worm gears which are driven by three differential gearing units.

2. The gear box of claim 1 wherein said input shaft drives said sun gears and also drives said differential gearing units while said worm gears drive said ring gears to give said carriers of said system output torques to drive the wheels.

3. The gear box of claim 1 wherein said input shaft drives said sun gears and also drives said differential gearing units while said worm gears drive said carriers to give said ring gears of said system output torques to drive the wheels.

4. The gear box claim 1 wherein said input shaft drives said planet carriers and also drives said differential gearing units while said worm gears drive said ring gears to give said sun gears of said systems output torques to drive the wheels.

5. The gear box of claim 1 wherein said input shaft drives said planet carriers and also drives said differential gearing units while said worm gears drive sun gears to give said ring gears of said systems output torques to drive the wheels.

6. The gear box of claim 1 wherein said input shaft drives said ring gear and also drives said differential gearing units while said worm gears drive said sun gears to give said carriers of said systems output torques to drive the wheels.

7. The gear box of claim 1 wherein said input shaft drives said ring gear and also drives said differential gearing units while said worm gears drive said carriers to give said sun gears of said systems output torques to drive the wheels.

8. The gear box of claim 1 wherein one of said differential gearing units is connected to said input shaft and gives outputs to drive the other two differential gearing units.

9. A gear box for locking-two-wheel drive mechanism consists of two planetary gearing systems each having a sun gear and a carrier, plurality of pinions connected to each said carrier each said sun gear and said pinions are connected inside of two ring gears, and said systems are connected to an input shaft and give outputs to two wheels and said systems are connected to two worm gears which are driven by a differential gearing unit.

10. The gear box of claim 9 wherein said input shaft drives said sun gears and also drives said differential gearing unit while said worm gears drive said ring gears to give said carriers of said systems output torques to drive the wheels.

11. The gear box of claim 9 wherein said input shaft drives said sun gears and also drives said differential gearing unit while said worm gears drive said carriers to give said ring gears of said systems output torques to drive the wheels.

12. The gear box of claim 9 wherein said input shaft drives said carriers and also drives said differential gearing unit while said worm gears drive said ring gears to give said sun gears of said systems output torques to drive the wheels.

13. The gear box of claim 9 wherein said input shaft drives said carriers and also drives said differential gearing unit while said worm gears drive said sun gears to give said ring gear of said systems output torques to drive the wheels.

14. The gear box of claim 9 wherein said input shaft drives said ring gears and also drive said differential gearing unit while said worm gears drive said sun gears to give said carriers of said systems output torques to drive the wheels.

15. The gear box of claim 9 wherein said input shaft drives said ring gears and also drives said differential gearing unit while said worm gears drive said carriers to give said sun gears of said system output torques to drive the wheels.

* * * * *